United States Patent [19]
Nedderman et al.

[11] Patent Number: 5,603,278
[45] Date of Patent: Feb. 18, 1997

[54] BUOYANT TEST VEHICLE POLYMER EJECTION NOSE ASSEMBLY

[75] Inventors: William H. Nedderman, Middletown; Robert Meunier, Portsmouth, both of R.I.

[73] Assignee: The United States of America as represented by the Secretary of the Navy, Washington, D.C.

[21] Appl. No.: 591,184

[22] Filed: Jan. 16, 1996

[51] Int. Cl.⁶ .................................................. B63B 1/34
[52] U.S. Cl. ........................................ 114/67 R; 114/20.1
[58] Field of Search ..................... 114/67 R, 67 A, 114/20.1, 20.2

[56] References Cited

U.S. PATENT DOCUMENTS

| | | | |
|---|---|---|---|
| 3,392,693 | 7/1968 | Hulsebos et al. | 114/67 R |
| 3,435,796 | 4/1969 | Merrill | 114/20.1 |
| 3,455,265 | 7/1969 | Bernd | 114/67 A |
| 3,455,266 | 7/1969 | Giles | 114/67 A |
| 4,987,844 | 1/1991 | Nadolink | 114/67 A |

Primary Examiner—Jesus D. Sotelo
Attorney, Agent, or Firm—Michael J. McGowan; Robert W. Gauthier; Prithvi C. Lall

[57] ABSTRACT

An underwater vehicle has a generally cylindrically portion with boundary layer polymer fluid storage and a pressurizing source provided therein, and a nose portion secured to the cylindrical portion and capable of being reconfigured for ejecting the polymer fluid from the nose adjacent the centerline of the vehicle or from the area of minimum pressure adjacent the juncture between the nose of the vehicle and the cylindrical portion. The nose portion can be reconfigured without breaking down the joint between the nose portion and the cylindrical portion of the vehicle. A removable plug is provided for isolating nose ejector ports, and a removable channel blocking dam is provided for isolating the ports provided in the area of minimum pressure adjacent the joint between the nose portion and the cylindrical portion of the vehicle. Further, the nose ejector ports are defined in a removable nose cap subassembly and a removable annular subassembly defines the ejector ports in the area of minimum pressure. Flexibility is further provided in that the forward nose and more rearward ejection configurations can be selected from a variety of such configurations to allow testing of different port configurations, sizes and slot shapes without replacing the entire nose portion of the vehicle.

17 Claims, 3 Drawing Sheets

BUOYANT TEST VEHICLE POLYMER EJECTION NOSE ASSEMBLY

STATEMENT OF GOVERNMENT INTEREST

The invention described herein may be manufactured and used by and for the Government of the United States of America for governmental purposes without the payment of any royalties thereon or therefore.

BACKGROUND OF THE INVENTION

1. Field of the Invention

The present invention relates generally to the reduction of drag on a vehicle moving through a fluid by injecting a polymer fluid into the boundary layer adjacent the nose portion of the vehicle, and deals more particularly with providing a unique nose portion for such a vehicle wherein a boundary layer fluid can be ejected either adjacent the nose at the center line of the vehicle, or can be ejected in the area of minimum pressure at the juncture between the nose of the vehicle and its cylindrical shell.

2. Description of the Prior Art

Polymer ejection systems for reducing the drag on a moving vehicle by ejecting a fluid at or near the area of minimum pressure in the nose portion of the vehicle are known. See for example Thompson, et al. U.S. Pat. Nos. 3,286,674, Hulsebos, et al. 3,392,693, Merrill 3,435,796, Fabula, et al. 4,186,679 and Nadolink 4,987,844. All of the above mentioned patents disclose the general concept of ejecting a polymer through ports which are spaced radially from the center line of the vehicle, and which are intended to introduce the fluid in the general area of minimum pressure where the surrounding fluid reaches its maximum velocity as the underwater vehicle is propelled through the fluid medium.

In the underwater test environment, so called buoyant test vehicles have been provided with polymer ejection ports in various locations including locations adjacent to the nose or forward end of the vehicle itself. In the testing environment, it has been necessary to replace the entire nose portion of such a buoyant test vehicle in order to test different configurations of ports, port sizes, slot shapes and to provide for testing of so called radial or forward end port ejection systems.

SUMMARY OF THE INVENTION

It is a general purpose and object of the present invention to provide a polymer fluid ejection system that is particularly useful in the buoyant test vehicle environment such that the nose of the vehicle can be reconfigured to test different port configurations, sizes, and slot shapes without replacing the entire nose portion of the vehicle.

It is another object of the invention to provide a polymer fluid ejection system that allows for radial port or forward end port ejection. It is a further object to provide a system that permits the nose portion of the vehicle to be readily reconfigured by one man using simple tools. It is a further object that the system be made up of relatively lightweight components and be nevertheless able to withstand the reentry loads imposed upon a buoyant test vehicle during the recovery stage.

It is yet another object of the invention that the components of the system are so aligned that the center of gravity of the entire configuration is maintained on the axial center line of the buoyant test vehicle itself.

A still further object is to provide components so designed that air trapped within the nose portion is automatically purged as the vehicle is brought beneath the surface of the fluid.

These and other objects are accomplished with the present invention by providing an underwater vehicle with a nose portion having passageway defining means with one end communicating with the polymer fluid storage and pressurizing means in the underwater vehicle. The nose portion includes an annular assembly which has channel defining segments communicating with the passageway defining means such that polymer fluid ejector ports communicate with these channel defining segments for directing the polymer rearwardly along the outside of the underwater vehicle aft of the nose portion thereof. The nose portion further includes a nose assembly as well as a nose ogive segment between the nose assembly and the annular assembly. This nose assembly defines ejector ports for diverting the polymer along the outside of the nose ogive segment of the nose portion. The passageway defining means includes a removable plug for isolating the nose ejector ports from the passageway defining means, and a removable channel blocking dam is provided for isolating the channel defining segments from the passageway defining means. Certain of these components are selected for use in order to achieve polymer fluid ejection at particular locations in the nose portion of the underwater vehicle, and certain of these components may be selected from groups of such components to achieve the above-mentioned advantages in the buoyant test vehicle environment which calls for testing different port sizes and slot shapes. The components are designed of lightweight material and are assembled using simple screwed or bolted connections such that components can be interchanged by one person. All components are designed to be symmetrical about the vehicle axis to maintain the center of gravity about the axial centerline of the vehicle. In addition, a series of ports, channels and tapered surfaces are integrated into the design of the components of the nose portion which, when the nose portion is submerged in a vertical attitude, serve to automatically purge air which may be trapped within cavities formed by these components.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
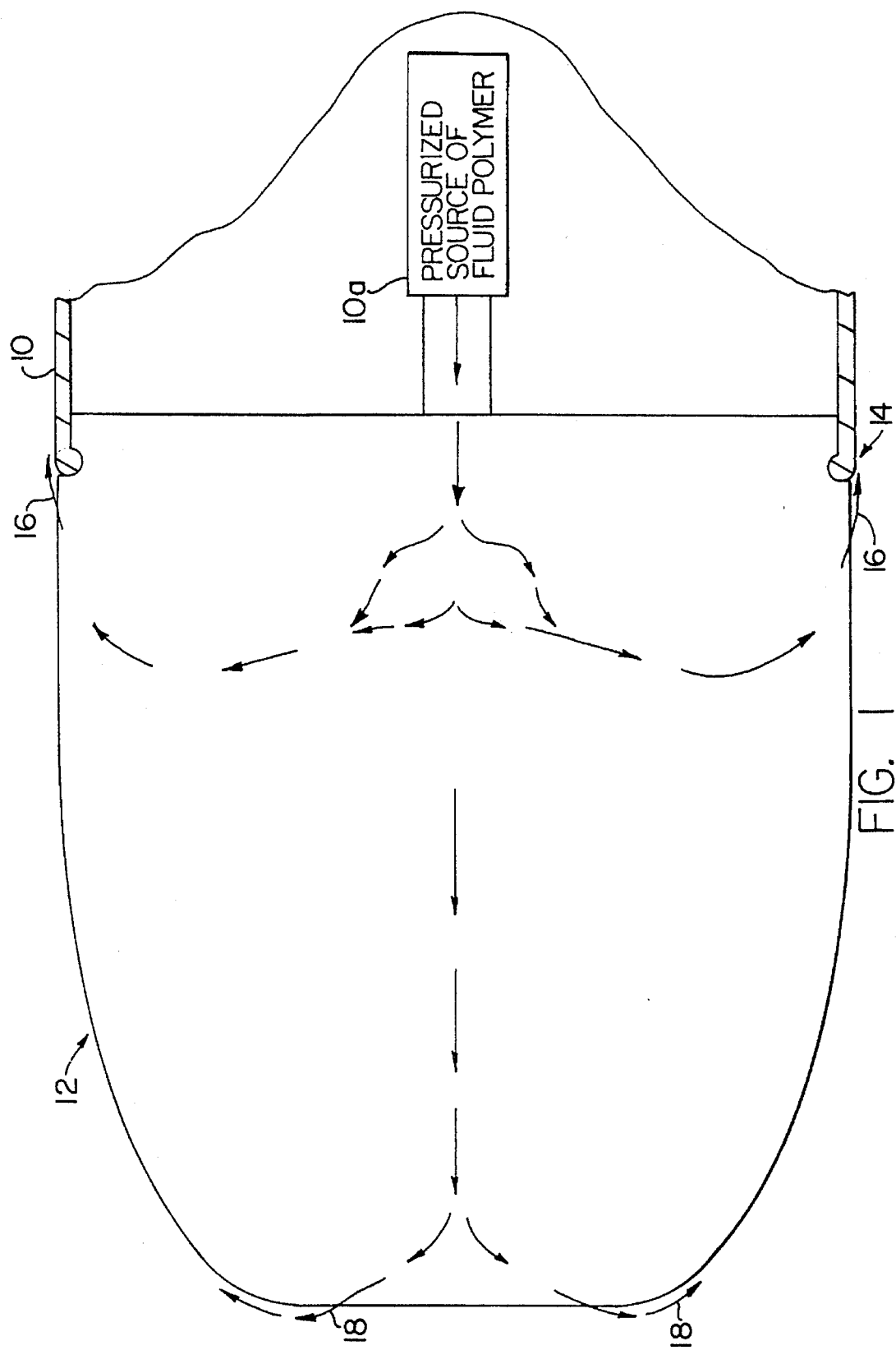
FIG. 1 shows a cylindrical shell portion and a nose portion of a buoyant test vehicle with an internal source of pressurized fluid polymer within the shell portion for delivery of the polymer fluid to the vehicle nose portion.

Referring to FIG. 1, a test vehicle is seen to have a generally cylindrical body portion or shell indicated generally at 10 which is joined to a nose portion indicated generally at 12. The nose portion 12 is conventionally attached to the cylindrical shell 10 forming a circumferential joint, the connection somewhat schematically illustrated at 14.

A pressurized source 10a of polymer fluid is provided in the cylindrical shell 10. The pressurized source of fluid polymer 10a is provided in communication with nose portion 12. Depending on the configuration of nose portion 12, fluid polymer from pressurized source 10a may be ejected in the area of joint 14 in the direction of arrows 16, or from ports (not shown) in the area and direction indicated generally at 18. For purposes of this invention, it is not necessary to break down joint 14 when polymer ejection is to be reconfigured from joint 14 area to ports area 18.

Figure 2:
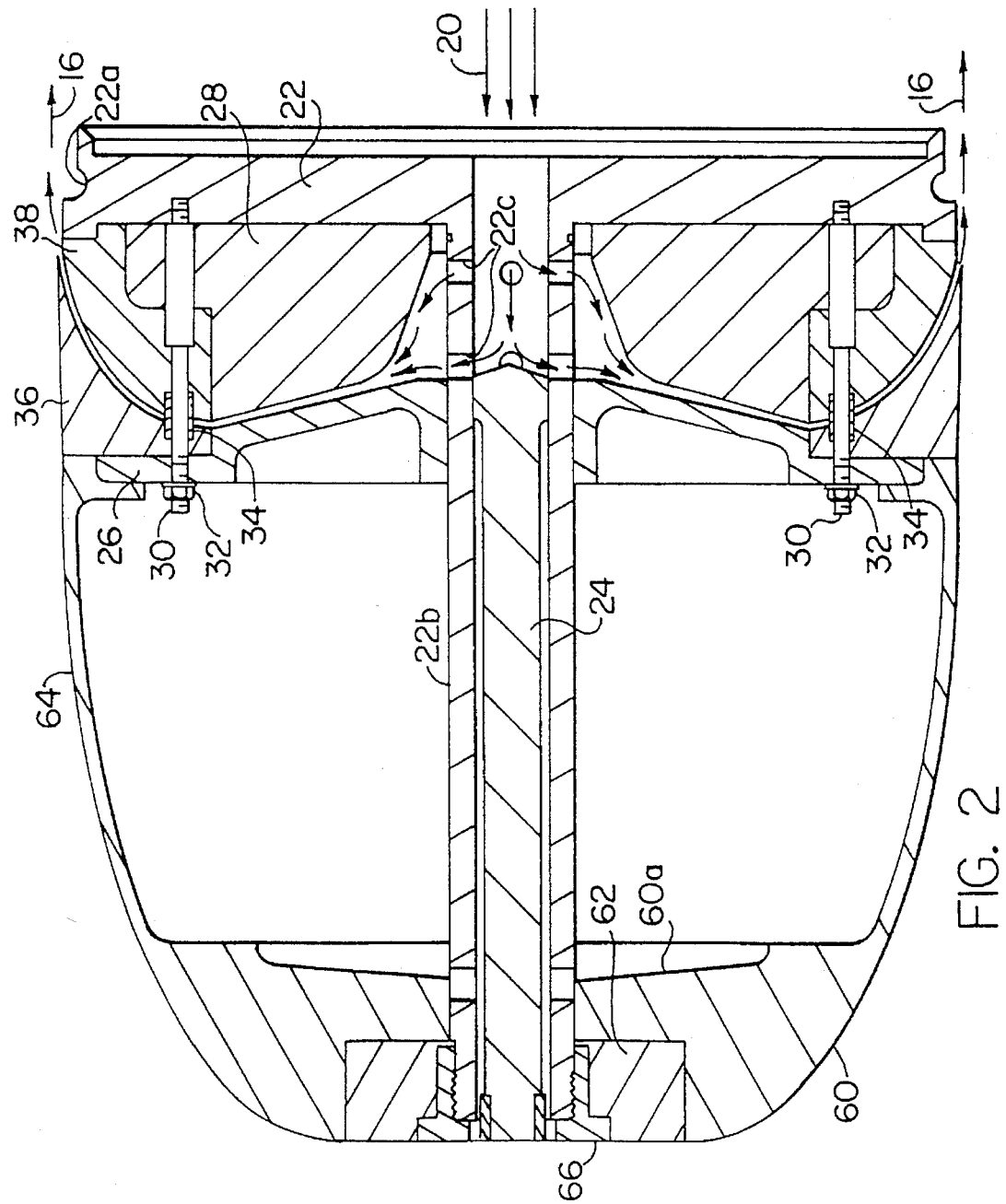
FIG. 2 shows a configuration for the nose portion of the vehicle suitable for achieving fluid ejection through ports spaced radially from the center line of the vehicle and adjacent to the juncture between the nose portion and the cylindrical shell portion of the underwater vehicle shown in FIG. 1.

Turning next to a detailed description of the configuration for the nose portion illustrated in FIG. 2, the boundary layer fluid flow 20 from the pressurized source of fluid polymer 10a as shown in FIG. 1 enters an opening provided in the base 22 for this purpose. The base 22 defines an annular groove 22a for receiving a flange provided for this purpose on the cylindrical shell 10 of the test vehicle. The base 22 also includes a forwardly extending pipe 22b which may be integrally formed with the base 22 or otherwise secured to it. This pipe 22b defines at least in part a passage-way means for providing the fluid boundary layer polymer to the forward end of the nose adjacent its center line as indicated generally by the arrows 18 in FIG. 1.

In the configuration of FIG. 2, the forwardly extending pipe 22b is blocked by virtue of the plug 24 which is inserted in the passageway defining portion of the pipe 22b. As so configured, the polymer fluid entering the central opening in the base 22 is diverted radially outwardly through ports 22c defined in the pipe 22b for this purpose. The fluid then flows between a forward channeler 26 and an aft channeler 28 through channels defined by channelers 26 and 28 so that the polymer passes over the vehicle's exterior immediately forward of the junction between the nose portion and the cylindrical shell of the vehicle.

Still with reference to FIG. 2, and referring in greater detail to the forward and aft channelers 26 and 28, these components cooperate with one another to define the channels for the fluid flow. These channelers 26 and 28 are of generally annular configuration so as to be conveniently mounted to the base 22. Locating studs 30 are provided in circumaxial spaced relationship around the base 22 for this purpose. Each locator stud is threaded in the base 22 for this purpose and has a threaded nut 32 provided on its forward end to hold the components in assembled relationship. Each locator nut further includes a stand off or spacer 34 which is provided to achieve a desired spacing between channelers 26 and 28 of the annular assembly.

Still with reference to FIG. 2, the channels through which the fluid flows are also defined by forward and aft ejector portions 36 and 38, respectfully, that are provided in a cavity defined by the assembled forward and aft channelers 26 and 28 for this purpose. The above-mentioned spacer or standoff 34 provided on each locator stud acts between these ejector portions 36 and 38 so as to achieve a desired cross sectional area for the ejector ports through which the fluid is directed so as to exit the nose portion generally in the directions of the arrows 16 in FIG. 2.

It will be apparent that the annular assembly just described includes several channel defining components in the form of the channelers 26 and 28, and ejectors 36 and 38 respectively, and that the channels defined by these components communicate with the passageway defined by the pipe 22b. It is an important feature of the invention that the pipe 22b and its base 22 remain secured to the underwater vehicle even as some components are reconfigured for purposes of testing different exit ejector configurations of which the ejectors 36 and 38 are but one example.

Figure 3:
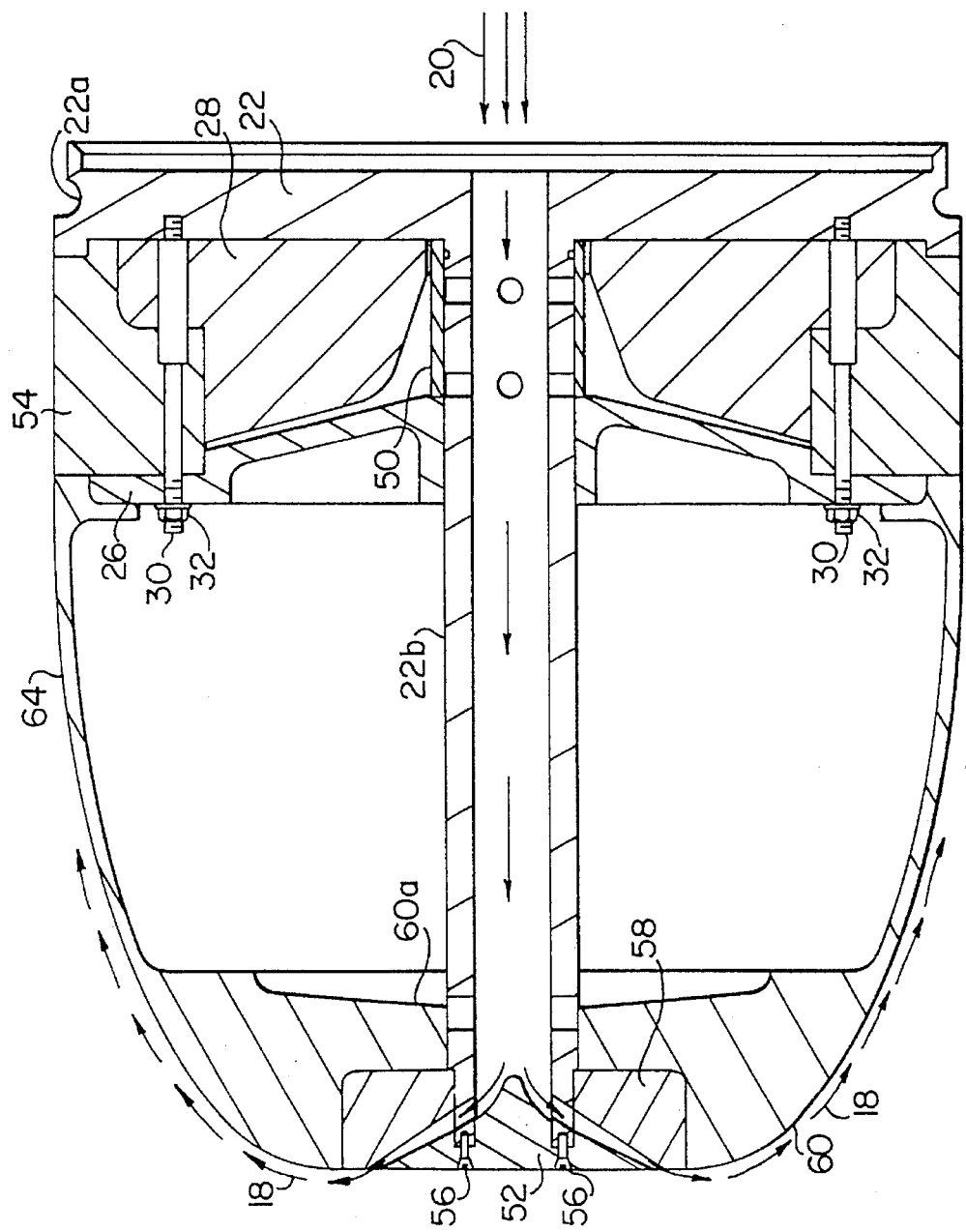
FIG. 3 shows the vehicle nose portion in a configuration for achieving polymer fluid ejection adjacent the forward end of the nose and adjacent the center line of the vehicle.

Considering next the configuration for the nose portion of FIG. 3, the above-described ejection ports that achieve the flow of polymer fluid in the direction of the arrows 16 in FIG. 2 have been disabled or isolated by reason of the annular dam 50 provided on the pipe 22b to close off the ports 22c in that pipe. Also, plug 24 of FIG. 2 has been removed. Thus, the fluid flow from the source of pressurized fluid polymer passes forwardly through the internal passageway defined by the pipe 22b and the fluid is diverted as a result of an annular diverter 52 provided in a nose assembly of the vehicle to be described. It should be noted that the channel defining segments in the form of the forward and aft channelers 26 and 28 still comprise the annular assembly referred to previously. However, in place of the removable forward and aft ejectors 36 and 38, a blanker 54 is provided between these channelers and held in place by the same locating studs 30 and threaded nuts 32. Thus, the individual ejector ports that would not be used in FIG. 3 nose configuration are eliminated to avoid having any influence on the testing of the FIG. 3 nose configuration.

Still with reference to FIG. 3, the nose assembly comprises the diverter 52 which is secured to the end of the pipe 22b by cap screws 56. In addition to the nose diverter, an annular nose ejector 58 is preferably provided in the annular nose element 60 so that both diverter 52 and ejector 58 can be conveniently removed for replacement by a nose filler block 62 (shown in FIG. 2) when the test vehicle is to be used solely for ejecting the fluid polymer in the manner described previously with respect to FIG. 2.

With reference to both FIGS. 2 and 3, it will be apparent that the overall configuration for the various components in each of the assemblies illustrated in these views does include many common components. For example, the base 22 is provided in permanently assembled relationship to the vehicle shell 10 as mentioned previously and is utilized in both configurations. So too, the channeler components 26 and 28 together with the locating pins 30 are also used in both configurations. A nose ogive, illustrated generally at 64, is also common to both configurations and serves to space the annular assembly associated with the base 22 from the nose assembly. Finally, the nose element 60, is also common to both configurations as well.

In order to alter the configuration of the nose for testing different ejector port shapes and sizes at the nose of the vehicle, threaded cap element 66 and nose filler block 62 are removed for replacement by nose diverter 52 and ejector 58. Such diverters and ejectors are selected from a group of paired elements to achieve various different ejector port configurations for purposes of testing different fluid flow rates and directions in the nose of the vehicle. So too, with respect to the testing of polymer fluid flow in the area illustrated at FIG. 2, the blanker 54 can be replaced by forward and aft ejectors 36 and 38 which are also selected from a group of slightly different port configurations to achieve various combinations of fluid flow rate and direction. These forward and aft ejectors correspond generally in overall shape and configuration to that of the blanker 54 as a result of which the nose portion can be conveniently reconfigured for use in either ejecting polymer fluid adjacent the nose and center line of the vehicle or ejecting polymer fluid in the manner suggested in FIG. 2. Obviously, the annular dam 50 must be removed in order to achieve this latter fluid flow configuration. The system can be reconfigured by one man utilizing essentially four manual tools. A spanner wrench, an allen wrench and a socket wrench are required. Furthermore, the integrity of the seal between the nose portion and the test vehicle body will not be compromised. The reconfigurations required can be accomplished without having to open up the vehicle itself thereby reducing down time during such configuration changeovers in the buoyant test vehicle environment.

The system described above is designed to survive buoyant test vehicle reentry loads, yet the individual components are light enough to be handled by one man during reconfiguration. The base is preferably made of aluminum while the majority of the remaining components are fabricated from plastic material such as Nylon or Delrin. The purging of trapped air outside the sealed pressured hull of the vehicle is readily achieved as a result of the design described above. Those components forming cavities within nose portion 12, such as annular nose element 60, are provided with tapered surfaces shown at 60a and air escape channels (not shown) allowing the nose portion to fill with fluid when submerged in a vertical altitude. The removal of air from the nose portion eliminates noise attributed to the rapid expansion of air bubbles as the vehicle rises to the fluid surface. Such air bubble noise could disrupt sensitive acoustic measurements taken during vehicle ascent. Further, each component has been designed to be symmetrical about the axial center line of the buoyant test vehicle to ensure that the center of gravity of the nose portion is located on this axial center line. Any mass or weight asymmetry could adversely affect the vertical flight path of the buoyant test vehicle since such vehicles are generally launched from a vertical position at the floor of a body of water, and are not controlled after launch but instead are acted upon solely by the buoyant force of the water when taken in combination with fluid friction, or drag forces on the vehicle as it passes through the water. The vehicle breaches the water surface at considerable speed and is ultimately recovered from the surface after reentry.

Flexibility is provided in the form of selecting components for both the forward nose and the rearward ejection configurations from a variety of configurations. The axial length of the spacer or standoff 34 will allow varying the cross sectional size of the channel in FIG. 2. In the nose configuration washers (not shown) may be provided between the diverter 52 and nose ejector 58 for the same purpose. Different ejection patterns for the fluid as it exits the various ports can be accomplished by selecting different components from a group of components that provide a variety of fluid flow rates and directions within the confines of the space provided in the cavity defined by the nose 60.

During actual operation, and to achieve a changeover from the forward ejection configuration of FIG. 3 to the side ejection configuration of FIG. 2, the following steps are accomplished. First the cap screws 56 are removed, after which the diverter 52 and nose ejector 58 can be removed from the nose 60. The ogive 64 is readily removed to provide access to the nuts on the locator studs 30. The forward channeler and blanker can then be removed, as well as the dam 50.

The aft ejector 38 is then assembled together with four standoffs 34 for the four locator studs 30. The forward ejector can then be reassembled followed by the forward channeler, after which the nuts are reassembled on the locator studs. The nose ogive can then be put in place so that the nose 60 and its filler 62 can be secured in place by the threaded cap element illustrated at 66 in FIG. 2.

The reverse process can be accomplished to changeover from the configuration of FIG. 2 to that of FIG. 3.

Obviously, many modifications and variations of the present invention may become apparent in light of the above teachings. For example, although the present invention is described with reference to a buoyant test vehicle, and has particular advantage in that environment, it will be apparent that underwater vehicles generally may benefit from features of the present invention. For instance, some vehicles may benefit more from ejection of polymer fluid at the nose where other vehicles may benefit from ejection adjacent the juncture between the nose and the shell of the vehicle itself. The common components of a nose portion of the present invention can be readily reconfigured for meeting either of these requirements.

In the appended claims, the term "annular subassembly" denotes the components that are removed for replacement with an "annular substitute subassembly" to change over from one nose configuration (FIG. 2) to another (FIG. 3). The same meaning applies to the term "nose cap substitute subassembly" as used in the appended claims.

What is claimed is:

1. In a vehicle traveling through a fluid, the vehicle having a generally cylindrical portion with a boundary layer fluid storage and pressurizing means and a nose portion, the nose portion comprising:

an annular assembly secured to a forward end of said cylindrical portion, the annular assembly having passageway defining means with an inlet end communicating with the boundary layer fluid storage and pressurizing means of the cylindrical portion, channel defining segments communicating with said passageway defining means and boundary layer fluid ejector port defining means communicating with said channel defining segments for directing boundary layer fluid rearwardly along the outside of said vehicle;

a nose ogive segment adjacent to said annular assembly; and a nose cap assembly having nose ejector ports for directing boundary layer fluid along the outside of said nose ogive segment, said nose ogive segment being between said nose assembly and said annular assembly, said passageway defining means including a removable plug for isolating said nose ejector ports from said passageway defining means.

2. The combination according to claim 1 further characterized by a removable channel blocking dam for isolating said channel defining segments from said passageway defining means.

3. The combination according to claim 2, wherein said annular assembly includes a removable annular subassembly defining said boundary layer fluid ejector port defining means, and a substitute annular subassembly for replacing said removable annular subassembly when said removable channel blocking dam so isolates said passageway defining means.

4. The combination according to claim 2, wherein said nose cap assembly includes a removable nose cap subassembly defining said nose ejector ports, and a nose cap substitute subassembly for replacing said removable nose cap ,subassembly when said removable plug isolates said passageway defining means.

5. The combination according to claim 4, wherein said annular assembly includes a removable annular subassembly defining said boundary layer fluid ejector port defining means, and a substitute annular subassembly for replacing said removable annular subassembly when said removable channel blocking dam so isolates said passageway defining means.

6. The combination according to claim 1 wherein said nose cap assembly includes a removable nose cap subassembly defining said nose ejector ports and a nose cap substitute subassembly for replacing said removable nose cap subassembly when said removable plug isolates said passageway defining means.

7. The combination according to claim 1, wherein said passageway defining means comprises a pipe provided on the center line of said nose portion and having an aft end defining said inlet end, said aft end secured in said annular assembly, said pipe also having a forward end secured to said nose cap assembly.

8. The combination according to claim 7, wherein said nose ogive segment is also of annular cross section and has an aft end secured to said annular assembly and a forward end secured to said nose cap assembly.

9. The combination according to claim 8, further characterized by a removable channel blocking dam for isolating said channel defining segments from said passageway defining means.

10. The combination according to claim 9, wherein said nose cap assembly includes a removable nose cap subassembly defining said nose ejector ports, and a nose cap substitute subassembly for replacing said removable nose cap subassembly when said removable plug isolates said passageway defining means.

11. The combination according to claim 10, wherein said annular assembly includes a removable annular subassembly defining said boundary layer fluid ejector port defining means, and a substitute annular subassembly for replacing said removable annular subassembly when said removable channel blocking dam so isolates said passage-way defining means.

12. The combination according to claim 8, wherein said nose cap assembly includes a removable nose cap subassembly defining said nose ejector ports, and a nose cap substitute subassembly for replacing said removable nose cap subassembly when said removable plug isolates said passageway defining means.

13. The combination according to claim 1 wherein said nose portion comprises air purging passageway means for removing air from said nose portion when said vehicle is submerged beneath said fluid, the vehicle oriented in a vertical position with the nose portion above the cylindrical portion.

14. The combination according to claim 13, further characterized by a removable channel blocking dam for isolating said channel defining segments from said passageway defining means.

15. The combination according to claim 14, wherein said nose cap assembly includes a removable nose cap subassembly defining said nose ejector ports, and a nose cap substitute subassembly for replacing said removable nose cap subassembly when said removable plug isolates said passageway defining means.

16. The combination according to claim 15, wherein said annular assembly includes a removable annular subassembly defining said boundary layer fluid ejector port defining means, and a substitute annular subassembly for replacing said removable annular subassembly when said removable channel blocking dam so isolates said passage-way defining means.

17. The combination according to claim 13, wherein said nose cap assembly includes a removable nose cap subassembly defining said nose ejector ports, and a nose cap substitute subassembly for replacing said removable nose cap subassembly when said removable plug isolates said passageway defining means.

* * * * *